3,005,815
ION EXCHANGE RECOVERY OF NEOMYCIN FROM CRUDE CULTURE BROTHS
Thomas W. Miller, Carteret, N.J., assignor to Merck & Co., Inc., Rahway, N.J., a corporation of New Jersey
No Drawing. Filed May 17, 1957, Ser. No. 659,773
3 Claims. (Cl. 260—210)

This invention relates to methods of purifying antibiotics. More particularly, it is concerned with methods of recovering neomycin from aqueous solutions thereof.

This application is a continuation-in-part of my co-pending application Serial No. 535,523, filed September 20, 1955, now abandoned.

Neomycin, a valuable antibiotic active against gram-positive and gram-negative organisms, is produced by the growing of a species of Streptomyces (No. 3535), closely related to *Streptomces fradiae*, in suitable aqueous nutrient mediums.

It is an object of the present invention to provide an improved method of recovering neomycin from culture broths containing this antibiotic. Another object is to provide a method for effecting the purification of neomycin. Other objects will be apparent from the detailed description hereinafter provided.

In accordance with the present invention, it is now found that neomycin can be recovered from solutions thereof by adsorbing the neomycin on a polystyrene sulfonic acid resin, and eluting the adsorbed neomycin with dilute aqueous ammonia. By this process the neomycin can be conveniently and effectively separated from impurities such as those occurring in fermentation broths.

In carrying out the process of the present invention, the solution containing the neomycin is passed through a column of the polystyrene sulfonic acid resin. The neomycin is adsorbed on the resin and effluent containing many of the impurities associated with the antibiotic is discarded. In thus effecting the adsorption of the neomycin, it is found that the process is operative at a pH of between about 5 to 8.5. In general, most satisfactory results are obtained with the resin on the alkali metal or ammonium cycle. This is conveniently accomplished by intimately contacting the resin prior to use with an alkali metal hydroxide or ammonia and then washing the resin with water to remove the excess base. In adsorbing the neomycin on the resin, the flow of the antibiotic solution is adjusted to allow sufficient contact time to remove substantially all of the neomycin from solution. The capacity of the resin for neomycin is readily ascertained by checking the effluent from the column to determine when breakthrough of the antibiotic occurs.

The polystyrene resins suitable for carrying out the processes of the present invention are prepared by sulfonating relatively amorphous cross-linked polystyrene resins having high porosity. These resins are prepared by copolymerizing the polystyrene resin with divinylbenzene so as to produce this relatively amorphous product with diminished internal stress so as to allow either complete or partial sulfonation without subsequent rupture on sudden immersion in water. Such copolymers containing divinylbenzene in an amount ranging from about 2 to 16% of divinylbenzene can be sulfonated with 94.5% sulfuric acid to produce the polystyrene sulfonic acid resins characterized by having high porosity which are so useful in practicing the present invention. Particularly suitable is a polystyrene sulfonic acid resin which is crosslinked with about 8% divinylbenzene and is available commercially under the trade name "Duolite C–25" (Chemical Process Co., Redwood City, California) since this resin has high internal porosity.

After adsorption of the antibiotic on the polystyrene sulfonic acid resin, the neomycin is conveniently eluted with aqueous ammonia. Although the concentration of the aqueous ammonia is not critical, it is preferred to use a concentration of ammonia equivalent to about 1 normal.

The neomycin in the ammoniacal solution obtained by the process described above can be recovered from solution by neutralizing with sulfuric acid, adding the neutralized solution to a volume of methanol sufficient to precipitate the product, and separating the precipitated, purified neomycin by filtration. Alternatively, the ammoniacal eluate can first be concentrated, for example, by evaporation under reduced pressure, and the product precipitated from the neutralized concentrate by adding it to methanol. Also, if desired, further purification of the neomycin eluted from the polystyrene sulfonic acid resins can be achieved by passing the concentrate over a strongly basic anion exchange resin, and/or by treating the neutralized solution with activated carbon.

It was indeed surprising and unexpected to find that neomycin can be satisfactorily eluted with aqueous ammonia from polystyrene sulfonic acid resins. Although neomycin is readily adsorbed on sulfonic acid resins, it had been found that the antibiotic could not be completely eluted from the usual sulfonic acid resins by any acceptable eluting agents. The sulfonic acid resins were therefore previously regarded as being unsuitable for the recovery and purification of neomycin. The method of the present invention provides a valuable method for the isolation and purification of neomycin on a commercial scale.

The following examples are illustrative of the processes of the present invention.

*Example 1*

12,000 ml. of neomycin broth was heated to 60° C., 40 g. of sodium dihydrogen phosphate added, and the pH brought to 7 with 30% sodium hydroxide. After addition of 1200 g. of filter aid the slurry was filtered.

The filtrate, of volume 9200 ml. at a pH of 8.2, was adjusted to 7.0 with phosphoric acid. This solution had a chemical assay of 0.66 mg. per ml.

8,050 ml. of the above solution was adsorbed down-flow on 350 ml. of Duolite C–25 resin (sodium cycle). A contact time of 10 minutes was used. The spent broth of volume 8100 ml. had a chemical assay of 0.006 mg. per ml. The resin adsorbate was eluted with 500 ml. of 1 N ammonium hydroxide and the column then washed with water. The eluate of 600 ml. was concentrated in vacuo to about 360 ml. One-third of this material was passed over 60 ml. of "Amberlite XE–98" (a strongly basic, anion-type, ion-exchange resin available from the Rohm & Haas Company) on the hydroxyl cycle. This served to decolorize the solution. The effluent of 250 ml. had a chemical assay of 6.23 mg. per ml. This is equivalent to an 88% recovery yield of neomycin.

The effluent was adjusted to pH 6.3 with sulfuric acid and the resulting solution treated with 3 g. of Darco G–60 for about 30 minutes. The mixture was then filtered and the filter cake washed thoroughly with water. The combined filtrate and washings contained by chemical assay 1.3 g. of neomycin. They were concentrated to a volume of about 20 ml. and the antibiotic precipitated by addition of the aqueous solution to about 5 volumes of methanol. During the precipitation the mixture was stirred. The product thus obtained was filtered, washed with methanol and dried to give 2.8 g. of material assaying 430 mcg. per mg.

Example 2

About 840 ml. of filtered fermentation broth at pH 8.0 containing 0.74 mg. of neomycin base per ml. was passed downflow through 20 ml. of Duolite C-25 resin on the sodium cycle at a rate of about 2 ml./min. The resin was washed clean with water.

The spent broth was assayed and found to contain 7% of the neomycin fed.

The column was eluted downflow with 1 N aqueous ammonia. 100 ml. of alkaline eluate were obtained containing 96% of the neomycin.

The column was then eluted with 2 N sulfuric acid. This eluate was found to contain a maximum of 2% of the neomycin.

The rich ammonia eluate was processed further by concentration, passage over 10 ml. of Amberlite XE98 resin on the hydroxyl cycle, neutralization with $H_2SO_4$, carbon treatment and methanol precipitation.

800 mg. of dried neomycin sulfate was obtained assaying 660 mcg. per mg., representing an 85% yield from broth.

Similar results were obtained when Duolite C-25 2X, a sulfonated polystyrene resin having 2% of divinylbenzene as the cross-linking agent, was substituted for the Duolite C-25 used in the foregoing example.

Example 3

The following example shows purification for upgrading in potency of a neomycin solution.

10 g. of neomycin sulfate equivalent to 4.9 g. of neomycin base was dissolved in 200 ml. of water (pH 6.5) and adsorbed on 20 ml. of Duolite C-25 (sodium cycle) at a flow rate of 1.5 ml. per minute. The effluent contained by chemical assay 1.9 mg. of neomycin base and was discarded. The resin column was eluted with 1 N ammonium hydroxide, flow rate about 1 ml. per minute.

Forerun: 25 ml., 300 mg. by chemical assay
Rich cut: 200 ml.
Tail cut: 105 ml., 240 mg. by chemical assay The rich cut was concentrated under reduced pressure to a volume of about 100 ml. and adjusted to pH 6.7 with sulfuric acid. This solution was treated for about 30 minutes with 500 mg. of Darco G-60, and the resulting slurry filtered to remove the charcoal. The charcoal cake was washed with water and these washes added to the main solution. The filtrate and washes were concentrated to about 70 ml. and the neomycin sulfate precipitated by slow addition to 5 volumes of methanol. The resulting precipitate was filtered and dried in vacuo. The yield obtained was 4.5 g. of neomycin sulfate having an assay of 570 mcg. per mg. as compared to an assay of 490 mcg. per mg. for the starting material.

The chemical assay for neomycin used in the illustrative examples shown above is based on the formation of furfural by the acid hydrolysis of neomycin. This assay is carried out as follows.

One ml. of a solution containing about 1 mg./ml. of neomycin is put into a labeled test tube and 10 ml. of 40% sulfuric acid by volume is added. The solutions are mixed by pouring from one test tube to another and finally divided by leaving approximately half in each tube. One tube is allowed to remain at room temperature and is used as a blank since a negligible amount of furfural is formed. The other tube is kept in boiling water for 60 min. and then cooled to room temperature. The optical density of the heated solution is read against the unheated blank at 280 mu. The blank minimizes the errors due to impurities which have U.V. absorption. The neomycin content of the sample is determined by comparing the optical density with the optical density found by running a standard or known solution at the same time. The optical density is directly proportional to the concentration of neomycin base. The optical density measurements are made on a Beckmann D.U. quartz spectrophotometer using a hydrogen lamp and silica cells.

In carrying out this chemical assay method on neomycin whole broth the sample of broth is purified before carrying out the assay by the following procedures.

500 ml. of fermentation broth is heated to 60° C. and 10 ml. of 10% sodium carbonate solution is added. The broth is filtered at 60° C. using about 10% diatomaceous earth filter aid and a precoated funnel. The filter cake is washed with hot water until no appreciable color comes through, giving about 700 ml. of filtrate. The filtrate is adjusted to pH 7.5 and passed through 50 ml. of Amberlite IRC-50 (a carboxylic acid resin sold under this trade name by the Rohm and Haas Company) on the sodium cycle at about 15 ml./min. The resin is washed with 200 ml. of water and then eluted with 150 ml. of 1 N aqueous ammonia. The ammoniacal eluate is concentrated to about 50 ml. and then diluted to 60 ml. with water. The concentrate so obtained is passed through 10 ml. of Amberlite XE-98 (a strongly basic, anion type, ion exchange resin sold under this trade name by the Rohm and Haas Company) on the hydroxyl cycle at a rate of about 2 ml./min. The column is washed with water until the volume of effluent is 100 ml. One ml. of the effluent is diluted to 5 ml. and assayed as described. Samples of other neomycin solutions are similarly purified by appropriate procedures as described above prior to the chemical assay. Thus, the ammonia eluate from the Duolite C-25 resin is concentrated, diluted with water, passed over the XE-98 resin, and the resin eluted with water as described above.

Various changes and modifications of the invention can be made and, to the extent that such variations incorporate the spirit of this invention, they are intended to be included within the scope of the appended claims.

What is claimed is:

1. A process for recovering neomycin from a filtered culture broth containing the same which comprises intimately contacting said culture broth with a polystyrene sulfonic acid resin cross-linked with 2 to 16 percent divinylbenzene at a pH of 5 to 8.5, eluting the resin adsorbate with dilute aqueous ammonia, and recovering neomycin from the resulting eluate.

2. The process of claim 1 wherein the neomycin is eluted with 1 N aqueous ammonia.

3. A process for recovering neomycin from a filtered culture broth containing the same which comprises intimately contacting said culture broth with a polystyrene sulfonic acid resin cross-linked with 2 to 16 percent divinylbenzene at a pH of 5 to 8.5, said resin being in the form of a salt selected from the group consisting of alkali metal and ammonium salts at the beginning of the adsorption cycle, eluting the resin adsorbate with dilute aqueous ammonia, and recovering neomycin from the resulting eluate.

References Cited in the file of this patent

UNITED STATES PATENTS

| | | |
|---|---|---|
| 2,528,022 | Van Dolah et al. | Oct. 31, 1950 |
| 2,560,504 | Day | July 10, 1951 |
| 2,667,441 | Nager | Jan. 26, 1954 |
| 2,827,417 | Friedman et al. | Mar. 18, 1958 |

FOREIGN PATENTS

| | | |
|---|---|---|
| 683,632 | Great Britain | Dec. 3, 1952 |

OTHER REFERENCES

Swart et al.: Arch. of Biochem., November 1949, pages 92–103.